United States Patent
Jung et al.

(10) Patent No.: US 9,922,773 B2
(45) Date of Patent: Mar. 20, 2018

(54) IONIC POLYMER MEMBRANE COMPRISING RADIATION-CROSSLINKABLE POLY(VINYL ALCOHOL) AND METHOD OF PREPARATION THEREOF

(71) Applicant: Korea Atomic Energy Research Institute, Daejeon (KR)

(72) Inventors: Chan Hee Jung, Gwangju (KR); Junhwa Shin, Gwangju (KR); In Tae Hwang, Jeollabuk-do (KR); Joon Yong Sohn, Jeollabuk-do (KR); Chang-Hee Jung, Gwangju (KR)

(73) Assignee: Korea Atomic Energy Research Institute, Daejeon (KR)

( * ) Notice: Subject to any disclaimer, the term of this patent is extended or adjusted under 35 U.S.C. 154(b) by 81 days.

(21) Appl. No.: 15/179,793

(22) Filed: Jun. 10, 2016

(65) Prior Publication Data
US 2017/0098511 A1    Apr. 6, 2017

(30) Foreign Application Priority Data
Oct. 1, 2015 (KR) .................. 10-2015-0138421

(51) Int. Cl.
| | |
|---|---|
| H01G 9/042 | (2006.01) |
| B01J 29/24 | (2006.01) |
| B01J 39/18 | (2017.01) |
| B01D 71/38 | (2006.01) |
| B01D 71/82 | (2006.01) |
| C08J 5/22 | (2006.01) |
| B01J 39/24 | (2017.01) |
| B01J 39/19 | (2017.01) |
| B01J 41/13 | (2017.01) |
| C02F 1/461 | (2006.01) |
| C02F 1/469 | (2006.01) |
| H01G 11/34 | (2013.01) |
| H01G 11/44 | (2013.01) |

(52) U.S. Cl.
CPC ............. *H01G 9/042* (2013.01); *B01D 71/38* (2013.01); *B01D 71/82* (2013.01); *B01J 39/19* (2017.01); *B01J 39/24* (2013.01); *B01J 41/13* (2017.01); *C02F 1/46109* (2013.01); *C08J 5/22* (2013.01); *B01D 2325/42* (2013.01); *C02F 1/4691* (2013.01); *H01G 11/34* (2013.01); *H01G 11/44* (2013.01); *Y02E 60/528* (2013.01)

(58) Field of Classification Search
CPC ........ H01G 9/042; H01G 11/34; H01G 11/44; B01J 39/24; B01J 39/28; B01J 41/12; B01J 41/13; B01D 71/38; B01D 71/82; B01D 2325/42; C02F 1/46109; C02F 1/4691; C08J 5/22
USPC ......................................................... 521/27
See application file for complete search history.

(56) References Cited

U.S. PATENT DOCUMENTS

| 7,094,490 B2 * | 8/2006 | Cao ................... C08G 65/4056 204/296 |
| 2007/0004900 A1 * | 1/2007 | Maier ................ H01M 8/1025 528/401 |

FOREIGN PATENT DOCUMENTS

| KR | 1020010025102 | 3/2001 |
| KR | 100843569 | 7/2008 |

* cited by examiner

*Primary Examiner* — Michael M Bernshteyn
(74) *Attorney, Agent, or Firm* — Klarquist Sparkman, LLP (57) ABSTRACT

The present invention provides an ionic polymer membrane prepared by irradiating the compound represented by formula 1 and an ionic polymer. The ionic polymer membrane of the present invention has the advantage of excellent processability, low production costs, high ion exchange capacity and high durability. Also, the method for preparing the ionic polymer membrane of the invention not only facilitates the production of the ionic polymer membrane in a 3-dimensional network structure which has high ion exchange capacity and high dimensional stability but also makes it easy to produce membranes in various forms and sizes by using the composition itself as a coating solution with using the commercialized inexpensive ionic polymer without additional high-risk multi-step introduction process of ionic exchange group. In the aspect of preparation process, the simplicity of the process and suitable for the mass-production, and the production cost is reduced by saving the processing time as much as minimum $\frac{1}{15}$ (56 min.) in comparison to the processing time of the conventional thermal-crosslinking (1 hour).

10 Claims, 6 Drawing Sheets

FIG. 1

SPVA

IONIC POLYMER MEMBRANE COMPRISING RADIATION-CROSSLINKABLE POLY(VINYL ALCOHOL) AND METHOD OF PREPARATION THEREOF

This application claims the benefit of Korean Patent Appl. No. 10-2015-0138421, filed Oct. 1, 2015, which is incorporated herein by reference in its entirety.

BACKGROUND OF THE INVENTION

1. Field of the Invention

The present invention relates to an ionic polymer membrane comprising the radiation crosslinkable poly(vinyl alcohol) and a preparation method of the same.

2. Description of the Related Art

An ionic polymer membrane is able to pass only cations or anions selectively. That is, the cationic polymer membrane can exchange only anions and the anionic polymer membrane can exchange cations alone. Such ionic polymer membranes have been applied to various fields including capacitive deionization, electrodialysis, diffusion dialysis, redox flow battery, and seawater desalination.

The commercial ionic polymer membranes are composed of hydrocarbon and fluorine based polymers added with ion-exchangeable functional groups, and the major providers are DuPont, Dow, Asahi Chemical, Asahi Glass, and Tokuyama, etc. However, the perfluorinated ionic polymer membrane has disadvantages of high production costs and low thermo-stability. The hydrocarbon based ionic polymer membrane can have advantages of high thermal stability and low production cost but their dimensional stability against moisture can be easily deteriorated with an increasing ion exchange capacity. So it is much difficult to produce the membrances with a high ion exchange capacity more than 1.5 meq./g.

Therefore, in the course of study on an ionic polymer membrane with high ion exchange capacity and high durability, the present inventors developed a flexible crosslinked ionic polymer membrane with a high ion exchange capacity and high dimensional stability that has been produced simply by mixing the commercial ionic polymer having 100 mol % of ion-exchangeable functional group with a specially synthesized double bond-introduced hydrophilic poly(vinyl alcohol) at a certain ratio, followed by irradiation, leading to the completion of this invention.

SUMMARY OF THE INVENTION

It is an object of the present invention to provide an ionic polymer membrane with high ion exchange capacity and high durability.

To achieve the above object, the present invention provides an ionic polymer membrane prepared by irradiating the compound represented by formula 1 below and an ionic polymer.

<Formula 1>

(In the formula 1,
$R_1$ is hydrogen or $C_{1-6}$ straight alkyl or $C_{3-6}$ branched alkyl,
The number of repeating unit a is 500 to 5500, and
The number of repeating unit b is 10 to 1500.)

The present invention also provides a method for preparing an ionic polymer membrane containing the step of spreading the mixed solution composed of the compound represented by formula 1 and the above-mentioned ionic polymer and then irradiating the mixture spread above.

The present invention further provides a method for preparing a carbon composite electrode comprising the following steps:

Spreading the mixed solution composed of the compound represented by formula 1 and an electroactive material on a matrix (step 1);

Spreading the mixed solution composed of the compound represented by formula 1 and an ionic polymer on the surface of the mixture spread on the matrix in step 1 (step 2); and Irradiating the mixture spread above (step 3).

In addition, the present invention provides a capacitive deionization electrochemical cell comprising the carbon composite electrode prepared by the method above.

Advantageous Effect

The ionic polymer membrane of the present invention has the advantage of excellent processability, low production costs, high ion exchange capacity and high durability. Also, the method for preparing the ionic polymer membrane of the invention not only facilitates the production of the ionic polymer membrane in a 3-dimensional network structure which has high ion exchange capacity and high dimensional stability but also makes it easy to produce membranes in various forms and sizes by using the composition itself as a coating solution with using the commercialized inexpensive ionic polymer without additional high-risk multi-step introduction process. In the aspect of preparation process, the simplicity of the process is suitable for the mass-production, and the production cost is reduced by saving the processing time as much as minimum $1/15$ (56 min.) in comparison to the processing time of the conventional thermal-crosslinking (1 hour).

Therefore, the present invention is expected to have a significant ripple effect of technology and economics in the manufacturing industry field of ionic polymer membranes including capacitive deionization, electrodialysis, diffusion dialysis, redox flow battery, and seawater desalination.

BRIEF DESCRIPTION OF THE DRAWINGS

The application of the preferred embodiments of the present invention is fully understood with reference to the accompanying drawings, wherein.

DESCRIPTION OF THE PREFERRED EMBODIMENTS

Hereinafter, the present invention is described in detail.

The present invention provides an ionic polymer membrane prepared by irradiating the compound represented by formula 1 below and an ionic polymer.

<Formula 1>

1

(In the formula 1,
$R_1$ is hydrogen or $C_{1-6}$ straight alkyl or $C_{3-6}$ branched alkyl,
The number of repeating unit a is 500 to 5500, and
The number of repeating unit b is 10 to 1500.)

Hereinafter, the ionic polymer membrane of the present invention is described in more detail.

The ionic polymer membrane of the present invention characteristically includes the compound represented by formula 1 above.

Particularly, the compound represented by formula 1 is preferably the poly(vinyl alcohol) (PVA) substituted with a monomer having a double bond, and the monomer having the double bond at this time is preferably an acrylic monomer, but not always limited thereto.

The number of repeating unit a in the compound represented by formula 1 can be 500 to 5500, and preferably 1100 to 3100, and the number of repeating unit b can be 10 to 1500, and preferably 20 to 1100.

Furthermore, the weight-average molecular weight of the compound represented by formula 1 is preferably 30,000 to 250,000, more preferably 35,000 to 200,000, and most preferably 45,000 to 160,000, but not always limited thereto.

The compound above is preferably the one produced by reaction formula 1 below.

<Reaction Formula 1>

-continued

1

(In the reaction formula 1,
$R_1$ is hydrogen, $C_{1-6}$ straight alkyl, or $C_{3-6}$ branched alkyl,
$R_2$ is $C_{1-10}$ straight alkyl or $C_{3-10}$ branched alkyl wherein one or more hydroxy groups are substituted or non-substituted or halogen is substituted or non-substituted; or $C_{6-10}$ heteroaryl comprising one or more heteroatoms selected from the groups consisting of oxygen heteroatom and nitrogen heteroatom and halogen is substituted or non-substituted; or $-(CH_2)_n-R_3$,
$R_3$ is non-substituted or substituted $C_{6-10}$ aryl, non-substituted or substituted $C_{3-10}$ cycloalkyl containing one or more oxygen atoms, $C_{1-10}$ straight alkoxy, or $C_{3-10}$ branched alkoxy;
n is an integer of 0 to 5;
the number of repeating unit a is 500 to 5500;
the number of repeating unit b is 10 to 1500; and
the number of repeating unit c is 500 to 6000.

As shown in reaction formula 1, the compound represented by formula 1 can be the compound prepared by the reaction between poly(vinyl alcohol) (formula 2) and the compound represented by formula 3.

For example, the poly(vinyl alcohol) is dissolved in aprotic solvent, to which an acrylic monomer is added at a required equivalence ratio. The mixture is simply heated, leading to the catalyst free substitution reaction. As a result, the poly(vinyl alcohol) having the double bond is prepared.

More particularly, as shown in reaction formula 1, the poly(vinyl alcohol) represented by formula 2 is dissolved in aprotic solvent at 50° C. to 90° C., preferably at 60° C. to 80° C., and more preferably at 70° C., which was then cooled down at room temperature. The acrylic monomer represented by formula 3 is added to the prepared solution above, followed by the substitution reaction at a proper temperature. The mixed solution is precipitated in an insoluble solvent. After filtering and drying the precipitate, the final product represented by formula 1, the poly(vinyl alcohol) having the double bond, is prepared.

At this time, the number of repeating unit c in the compound represented by formula 2 is preferably 500 to 6000, and more preferably 1100 to 3400.

As the aprotic solvent, dimethylsulfoxide can be used. The content of the compound represented by formula 2 is preferably 2 weight % to 15 weight %, and more preferably 3 weight % to 10 weight %. If the content of the compound represented by formula 2 in the total mixture is less than 2 weight %, the yield would be too low. If the content is more than 15 weight %, the viscosity would be too high, resulting in the unsatisfactory substitution reaction.

In the monomer represented by formula 3 in reaction formula 1, $R_1$ can be hydrogen or methyl, and $R_2$ can be one of the compounds selected from the group consisting of methyl, ethyl, propyl, isopropyl, butyl, isobutyl, tert-butyl, hexyl, cyclohexyl, phenyl, benzyl, hydroxymethyl, hydroxyethyl, hydroxypropyl, hydroxybutyl, glycidyl, and methoxyethyl. For example, methacrylate, propylmethacrylate, isopropyl methacrylate, hydroxybutyl methacrylate, and methoxyethylo methacrylate can be used.

Also, the reaction of reaction formula 1 is the catalyst-free substitution reaction simply induced by heating. At this time, the reaction temperature is preferably 25° C. to 100° C., more preferably 30° C. to 90° C., and most preferably 35° C. to 80° C., but not always limited thereto. The reaction time is preferably 1 to 12 hours, and more preferably 3 to 10 hours, but not always limited thereto.

If the reaction temperature is lower than 25° C., substitution reaction is not induced. If the reaction temperature is over 100° C., gelation progresses during the substitution reaction, resulting in the unsatisfactory substitution reaction. If the reaction time is less than an hour, substitution reaction does not occur desirably. If the reaction time is more than 12 hours, the substitution ratio is saturated.

As the solvent for the precipitation to obtain the compound of formula 1 in reaction formula 1, acetone or isopropyl alcohol can be used.

In addition, the compound represented by formula 1 has preferably the substitution ratio of 1 mol % to 30 mol %. If the compound has a low substitution ratio below 1%, the compound is not dissolved in an organic solvent at room temperature and its cross-linking efficiency drops very low. If the substitution ratio is more than 30 mol %, the yield of the production becomes very low and the resulting compound is hydrophobic and immiscible with ionic polymer.

The ionic polymer membrane of the present invention contains an ionic polymer. The above-mentioned ionic polymer can be the polymer having a cation exchanging functionality, the polymer having an anion exchanging functionality, and chelate resin, etc. The polymer having a cation exchanging functionality can be the anionic polymer having a functional group that can exchange such cations as sulfonic acid, carboxylic acid, phosphoric acid, sulfonate, carboxylate, and phosphate. The polymer having an anion exchanging functionality can be the cationic polymer having a functional group that can exchange such anions as quaternary ammonium salts and primary-tertiary amines.

In a preferred embodiment of the present invention, the anionic polymer is preferably poly(sodium 4-styrene sulfonic acid), poly(sodium 4-styrene sulfonate), poly(2-acrylamido-2-methyl-1-propanesulfonic acid, poly(vinyl sulfonic acid), poly(acrylic acid), poly(4-styrene sulfonic acid-co-maleic acid, poly(vinyl phosphonic acid), sulfonated poly(ether ether ketone), sulfonated polyacetal, sulfonated polyphenylene oxide, sulfonated polysulfone, sulfonated poly(ether sulfone), sulfonated polyphenylene sulfide, or a mixture thereof.

In a preferred embodiment of the invention, the cationic polymer is preferably poly(diallydimethyl ammonium chloride), poly(allyl amine chloride), poly(acrylamido-co-diallydimethylammonium chloride), poly(2-dimethylamino) ethyl methacrylate) methyl chloride, or a mixture thereof.

The mixing ratio of the compound represented by formula 1 and the ionic polymer is preferably 0.5:9.5 to 9.5:0.5, and more preferably 1:9 to 8:2. If the compound represented by formula 1 is included at the weight ratio of less than 0.5:9.5, the mechanical properties of the produced ionic polymer membrane or thin film will be weak. On the other hand, if the compound is mixed at the weight ratio of more than 9.5:0.5, the ion exchange capacity of the produced ionic polymer membrane or thin film will be poor.

The ionic polymer membrane of the present invention is characteristically prepared by irradiation. The ionic polymer membrane of the invention can have a 3-dimensional network structure via irradiation.

The radiation used herein is electron beam, gamma-ray, or X-ray, but not always limited thereto.

If the radiation used herein is electron beam, the preferable exposure dose rate is 0.1 kGy/s to 10 kGy/s and the preferable total dose is 5 kGy to 500 kGy. If the exposure dose rate is less than 0.1 kGy/s, the production time will be extended, resulting in the decrease of the productivity. If the exposure dose rate is more than 10 kGy/s, thermal damage will be induced, resulting in the decrease of the performance of the ionic polymer membrane. If the total dose is less than 5 kGy, the 3-dimensional network structure will not be formed on the ionic polymer membrane. If the total dose exceeds 500 kGy, the irradiation will have no longer effect on the formation of the 3-dimensional network structure, resulting in a waste of energy.

If the radiation used herein is gamma-ray or X-ray, the preferable exposure dose rate is 1 kGy/hr to 100 kG/hr and the preferable total dose is 5 kGy to 500 kGy. At this time, if the exposure dose rate is less than 1 kGy/hr, the production time will be extended, resulting in the decrease of the productivity. If the exposure dose rate is over 100 kGy/hr, thermal damage will be induced, resulting in the decrease of the performance of the ionic polymer membrane. If the total dose is less than 5 kGy, the 3-dimensional network structure will not be formed. If the total dose is more than 500 kGy, the irradiation will have no longer effect on the formation of the 3-dimensional network structure, resulting in a waste of energy.

As described herein above, the ionic polymer membrane of the present invention displays excellent processability, high ion exchange capacity, and high durability but requires low production costs.

The present invention also provides a method for preparing an ionic polymer membrane containing the step of spreading the mixed solution composed of the compound represented by formula 1 and the ionic polymer and then irradiating the mixture spread above.

<Formula 1>

(In the formula 1,
$R_1$ is hydrogen or $C_{1-6}$ straight alkyl or $C_{3-6}$ branched alkyl,
The number of repeating unit a is 500 to 5500, and
The number of repeating unit b is 10 to 1500.)

Hereinafter, the method for preparing the ionic polymer membrane of the present invention is described in more detail.

The method for preparing the ionic polymer membrane of the invention comprises the following steps:
Preparing a mixed solution by mixing the compound represented by formula 1 and the ionic polymer;
Spreading the mixed solution prepared above; and
Irradiating the mixture spread above.

According to the method for preparing the ionic polymer membrane of the present invention, a mixed solution comprising the compound represented by formula 1 which is a hydrophilic polymer having a double bond that is crosslinkable by irradiation at room temperature in a short time for securing the flexibility of the ionic polymer membrane and the ionic polymer having an excellent ion exchange capacity for securing high ion exchange capacity is prepared first and then this mixed solution is spread, so that the ionic polymer membrane precursor (mixture) is formed. Then, the mixture spread above is irradiated, resulting in the production of the ionic polymer membrane.

Particularly, the compound represented by formula 1 is preferably the poly(vinyl alcohol) (PVA) substituted with a monomer having a double bond, and the monomer having the double bond at this time is preferably an acrylic monomer, but not always limited thereto.

Furthermore, the weight-average molecular weight of the compound represented by formula 1 is preferably 30,000 to 250,000, more preferably 35,000 to 200,000, and most preferably 45,000 to 160,000, but not always limited thereto.

In addition, the compound represented by formula 1 of step 1 preferably displays the substitution ratio of 1 mol % to 30 mol %, which is prepared by the catalyst-free substitution reaction.

The above-mentioned ionic polymer can be the polymer having a cation exchanging functionality, the polymer having an anion exchanging functionality, and chelate resin, etc. The polymer having a cation exchanging functionality can be the anionic polymer having a functional group that can exchange such cations as sulfonic acid, carboxylic acid, phosphoric acid, sulfonate, carboxylate, and phosphate. The polymer having an anion exchanging functionality can be the cationic polymer having a functional group that can exchange such anions as quaternary ammonium salts and primary-tertiary amines.

In a preferred embodiment of the present invention, the anionic polymer is preferably poly(sodium 4-styrene sulfonic acid), poly(sodium 4-styrene sulfonate), poly(2-acrylamido-2-methyl-1-propanesulfonic acid, poly(vinyl sulfonic acid), poly(acrylic acid), poly(4-styrene sulfonic acid-co-maleic acid, poly(vinyl phosphonic acid), sulfonated poly(ether ether ketone), sulfonated polyacetal, sulfonated polyphenylene oxide, sulfonated polysulfone, sulfonated poly(ether sulfone), sulfonated polyphenylene sulfide, or a mixture thereof.

In a preferred embodiment of the invention, the cationic polymer is preferably poly(diallydimethyl ammonium chloride), poly(allyl amine chloride), poly(acrylamido-co-diallydimethylammonium chloride), poly(2-dimethylamino) ethyl methacrylate) methyl chloride, or a mixture thereof.

The mixing ratio of the compound represented by formula 1 and the ionic polymer is preferably 0.5:9.5 to 9.5:0.5, and more preferably 1:9 to 8:2. If the compound represented by formula 1 is included at the weight ratio of less than 0.5:9.5, the mechanical properties of the produced ionic polymer membrane or thin film will be weak. On the other hand, if the compound is mixed at the weight ratio of more than 9.5:0.5, the ion exchange capacity of the produced ionic polymer membrane or thin film will be poor.

The above-mentioned mixed solution can include such a solvent as N-methyl-2-pyrrolidone, dimethylsulfoxide, and dimethylformamide, but not always limited thereto. Also, the spreading can be performed by bar coating, roll coating, blade coating, and spray coating, etc.

After spreading the mixed solution, the remaining solvent can be eliminated by drying in a vacuum or normal pressure oven at 80° C. or under.

The method for preparing the ionic polymer membrane of the present invention includes the step of irradiation to form a 3-dimensional network structure on the mixture spread above.

Particularly, the radiation used herein is electron beam, gamma-ray, or X-ray, but not always limited thereto.

If the radiation used herein is electron beam, the preferable exposure dose rate is 0.1 kGy/s to 10 kGy/s and the preferable total dose is 5 kGy to 500 kGy. If the exposure dose rate is less than 0.1 kGy/s, the production time will be extended, resulting in the decrease of the productivity. If the exposure dose rate is more than 10 kGy/s, thermal damage will be induced, resulting in the decrease of the performance of the ionic polymer membrane. If the total dose is less than 5 kGy, the 3-dimensional network structure will not be formed on the ionic polymer membrane. If the total dose exceeds 500 kGy, the irradiation will have no longer effect on the formation of the 3-dimensional network structure, resulting in a waste of energy.

If the radiation used herein is gamma-ray or X-ray, the preferable exposure dose rate is 1 kGy/hr to 100 kG/hr and the preferable total dose is 5 kGy to 500 kGy. At this time, if the exposure dose rate is less than 1 kGy/hr, the production time will be extended, resulting in the decrease of the productivity. If the exposure dose rate is over 100 kGy/hr, thermal damage will be induced, resulting in the decrease of the performance of the ionic polymer membrane. If the total dose is less than 5 kGy, the 3-dimensional network structure will not be formed. If the total dose is more than 500 kGy, the irradiation will have no longer effect on the formation of the 3-dimensional network structure, resulting in a waste of energy.

As described hereinabove, the method for preparing the ionic polymer membrane of the present invention not only facilitates the production of the ionic polymer membrane in a 3-dimensional network structure which has high ion exchange capacity and high dimensional stability but also makes it easy to produce membranes in various forms and sizes by using the composition itself as a coating solution with using the commercialized inexpensive ionic polymer without additional high-risk multi-step introduction process of ionic exchange group. In the aspect of preparation process, the simplicity of the process and suitable for the mass-production, and the production cost is reduced by saving the processing time as much as minimum 1/15 (56 min.) in comparison to the processing time of the conventional thermal-crosslinking (1 hour).

The present invention further provides a method for preparing a carbon composite electrode comprising the following steps:

spreading the mixed solution composed of the compound represented by formula 1 and an electroactive material on a matrix (step 1);

spreading the mixed solution composed of the compound represented by formula 1 and an ionic polymer on the surface of the mixture spread on the matrix in step 1 (step 2); and irradiating the mixture spread above (step 3).

Hereinafter, the method for preparing the carbon composite electrode of the invention is described in detail step by step.

First, in the method for preparing the carbon composite electrode of the invention, step 1 is to spread the mixed solution composed of the compound represented by formula 1 and an electroactive material on a matrix.

In step 1, the mixed solution comprising the compound represented by formula 1 that is a radiation-crosslinkable hydrophilic polymer and an electroactive material is prepared and spread on a matrix to form a carbon electrode.

At this time, the compound represented by formula 1 is preferably the poly(vinyl alcohol) (PVA) substituted with a monomer having a double bond, and the monomer having the double bond at this time is preferably an acrylic monomer, but not always limited thereto.

Further, the weight-average molecular weight of the compound represented by formula 1 is preferably 30,000 to 250,000, more preferably 35,000 to 200,000, and most preferably 45,000 to 160,000, but not always limited thereto.

In addition, the compound represented by formula 1 of step 1 preferably displays the substitution ratio of 1 mol % to 30 mol %, which is prepared by the catalyst-free substitution reaction.

The electroactive material of step 1 can be an activated carbon material having the specific surface area of 600 $m^2/g$ or more, and preferably an activated carbon material having the specific surface area of 600 $m^2/g$ to 100,000 $m^2/g$. In a preferred embodiment of the present invention, this material can be activated carbon power, activated carbon fiber, carbon nano tube, carbon aerogel, or a mixture thereof.

Further, the mixing ratio of the compound represented by formula 1 and the electroactive material in step 1 is preferably the weight ratio of 4:6 to 0.1:9.9, and more preferably the weight ratio of 3:7 to 0.2:9.8, and most preferably the weight ratio of 2:8 to 0.4:9.6. If the compound represented by formula 1 of step 1 is added more than at the weight ratio of 4:6, the electrical conductivity of the carbon electrode produced thereby would be lower to reduce capacitance. If the compound is mixed with the weight ratio of less than 0.1:9.9, the compound represented by formula 1 cannot fix the electroactive material, resulting in the problem in the formation of the carbon electrode.

The mixed solution of step 1 can include such a solvent as N-methyl-2-pyrrolidone, dimethylsulfoxide, and dimethylformamide, but not always limited thereto.

The matrix of step 1 is preferably the current collector such as aluminum, nickel, copper, titanium, iron, stainless steel, and graphite, but not always limited thereto.

Also, the spreading in step 1 can be performed by bar coating, roll coating, blade coating, and spray coating, etc.

After spreading the mixed solution in step 1, the remaining solvent can be eliminated by drying in a vacuum or normal pressure oven at 80° C. or under.

Next, in the method for preparing the carbon composite electrode of the present invention, step 2 is to spread the mixed solution composed of the compound represented by formula 1 and an ionic polymer on the surface of the mixture spread in step 1.

In this step, the mixed solution comprising an ionic polymer is spread on the surface of the mixture spread in step 1 in order to form an ionic polymer membrane on top of the carbon electrode.

The ionic polymer of step 2 can be the polymer having a cation exchanging functionality, the polymer having an anion exchanging functionality, and chelate resin, etc. The polymer having a cation exchanging functionality can be the anionic polymer having a functional group that can exchange such cations as sulfonic acid, carboxylic acid, phosphoric acid, sulfonate, carboxylate, and phosphate. The polymer having an anion exchanging functionality can be the cationic polymer having a functional group that can exchange such anions as quaternary ammonium salts and primary-tertiary amines.

In a preferred embodiment of the present invention, the anionic polymer is preferably poly(sodium 4-styrene sulfonic acid), poly(sodium 4-styrene sulfonate), poly(2-acrylamido-2-methyl-1-propanesulfonic acid, poly(vinyl sulfonic acid), poly(acrylic acid), poly(4-styrene sulfonic acid-co-maleic acid, poly(vinyl phosphonic acid), sulfonated poly(ether ether ketone), sulfonated polyacetal, sulfonated polyphenylene oxide, sulfonated polysulfone, sulfonated poly(ether sulfone), sulfonated polyphenylene sulfide, or a mixture thereof.

In a preferred embodiment of the invention, the cationic polymer is preferably poly(diallydimethyl ammonium chloride), poly(allyl amine chloride), poly(acrylamido-co-diallydimethylammonium chloride), poly(2-dimethylamino) ethyl methacrylate) methyl chloride, or a mixture thereof.

The mixing ratio of the compound represented by formula 1 and the ionic polymer is preferably 0.5:9.5 to 9.5:0.5, and more preferably 1:9 to 8:2. If the compound represented by formula 1 is included at the weight ratio of less than 0.5:9.5, the mechanical properties of the produced ionic polymer membrane or thin film will be weak. On the other hand, if the compound is mixed at the weight ratio of more than 9.5:0.5, the ion exchange capacity of the produced ionic polymer membrane or thin film will be poor.

The mixed solution of step 2 can include such a solvent as N-methyl-2-pyrrolidone, dimethylsulfoxide, and dimethylformamide, but not always limited thereto. Also, the spreading in step 1 can be performed by bar coating, roll coating, blade coating, and spray coating, etc.

In the method for preparing the carbon composite electrode of the present invention, step 3 is to irradiate the spread mixture.

In this step, the mixtures spread in step 1 and step 2 are irradiated in order to form a 3-dimensional network structure.

Particularly, the radiation used in step 3 is electron beam, gamma-ray, or X-ray, but not always limited thereto.

If the radiation used in step 3 is electron beam, the preferable exposure dose rate is 0.1 kGy/s to 10 kGy/s and the preferable total dose is 5 kGy to 500 kGy. If the exposure dose rate is less than 0.1 kGy/s, the production time will be extended, resulting in the decrease of the productivity. If the exposure dose rate is more than 10 kGy/s, thermal damage will be induced, resulting in the decrease of the performance of the ionic polymer membrane. If the total dose is less than 5 kGy, the 3-dimensional network structure will not be formed on the ionic polymer membrane. If the total dose exceeds 500 kGy, the irradiation will have no longer effect on the formation of the 3-dimensional network structure, resulting in a waste of energy.

If the radiation used in step 3 is gamma-ray or X-ray, the preferable exposure dose rate is 1 kGy/hr to 100 kG/hr and the preferable total dose is 5 kGy to 500 kGy. At this time, if the exposure dose rate is less than 1 kGy/hr, the production time will be extended, resulting in the decrease of the productivity. If the exposure dose rate is over 100 kGy/hr, thermal damage will be induced, resulting in the decrease of the performance of the ionic polymer membrane. If the total dose is less than 5 kGy, the 3-dimensional network structure will not be formed. If the total dose is more than 500 kGy, the irradiation will have no longer effect on the formation of the 3-dimensional network structure, resulting in a waste of energy.

In addition, the present invention provides a capacitive deionization electrochemical cell comprising the carbon composite electrode prepared by the above-mentioned method.

The capacitive deionization electrochemical cell comprising the carbon composite electrode of the present invention displays excellent electrochemical characteristics by comprising the 3-dimensional networked carbon electrode with a hydrophilic binder-induced outstanding wettability and good electrical conductivity.

Practical and presently preferred embodiments of the present invention are illustrative as shown in the following Examples.

However, it will be appreciated that those skilled in the art, on consideration of this disclosure, may make modifications and improvements within the spirit and scope of the present invention.

Example 1: Preparation of Hydrophilic Poly(Vinyl Alcohol) (SPVA) Having a Double Bond Via Catalyst-Free Substitution Reaction 1

Poly(vinyl alcohol) (weight-average molecular weight: 89000, degree of hydrolysis: 99%, Aldrich) was dissolved in dimethylsulfoxide at 70° C., resulting in 5 weight % poly(vinyl alcohol) solution.

The prepared solution was cooled down at room temperature. 300 ml of the solution was added in a 500 ml round flask, to which glycidyl methacrylate (GMA, Aldrich) was added at the ratio of 10 mol % by the content of the poly(vinyl alcohol) OH functional group. Catalyst-free substitution reaction was induced at 60° C. for 8 hours.

The mixture was precipitated in acetone, the non-soluble solvent, followed by drying. As a result, hydrophilic poly(vinyl alcohol) (substituted poly(vinyl alcohol), SPVA) having the theoretical substitution ratio of 10 mol % was prepared.

Example 2: Preparation of Hydrophilic Poly(Vinyl Alcohol) (SPVA) Having a Double Bond Via Catalyst-Free Substitution Reaction 2

Hydrophilic poly(vinyl alcohol) (substituted poly(vinyl alcohol), SPVA) having the theoretical substitution ratio of 18 mol % was prepared by the same manner as described in Example 1 except that glycidyl methacrylate was added at the ratio of 18 mol % by the content of the poly(vinyl alcohol) OH functional group for the catalyst-free substitution reaction at 60° C. for 8 hours.

Example 3: Preparation of Hydrophilic Poly(Vinyl Alcohol) (SPVA) Having a Double Bond Via Catalyst-Free Substitution Reaction 3

Hydrophilic poly(vinyl alcohol) (substituted poly(vinyl alcohol), SPVA) having the theoretical substitution ratio of 10 mol % was prepared by the same manner as described in Example 1 except that poly(vinyl alcohol) having the weight-average molecular weight of 130,000 was used herein.

Example 4: Preparation of Hydrophilic Poly(Vinyl Alcohol) (SPVA) Having a Double Bond Via Catalyst-Free Substitution Reaction 4

Hydrophilic poly(vinyl alcohol) (substituted poly(vinyl alcohol), SPVA) having the theoretical substitution ratio of 18 mol % was prepared by the same manner as described in Example 3 except that glycidyl methacrylate was added at the ratio of 18 mol % by the content of the poly(vinyl alcohol) OH functional group for the catalyst-free substitution reaction at 60° C. for 8 hours.

Example 5: Preparation of Ionic Polymer Membrane 1

The SPVA having the substitution ratio of 10 mol % prepared from poly(vinyl alcohol) with the molecular weight of 89,000 prepared in Example 1 and the ionic polymer, cationic poly(sodium 4-styrene sulfonate) (PSSNa, MW: 1,000,000, Aldrich), were respectively dissolved in dimethyl sulfoxide and distilled water to prepare the 11 weight % solution. At this time, SPVA and PSSNa were mixed at the weight ratio of 6:4 to prepare the mixed solution.

13 g of the SPVA/ionic polymer mixed solution prepared above was spread evenly in a rubber frame (10 cm (width)× 10 cm (length)×0.3 cm (height)) on the glass board, followed by drying in a 70° C. oven for 8 hours to form a 100 μm thick ionic polymer membrane.

Lastly, the ionic polymer membrane formed above was irradiated with electron beam at the dose of 50 kGy by using 2.5 MeV electron beam accelerator (EBTech, Daejeon). As a result, the ionic polymer membrane having a 3-dimensional network structure was prepared.

Example 6: Preparation of Ionic Polymer Membrane 2

The ionic polymer membrane was prepared by the same manner as described in Example 5 except that the dose of electron beam was 100 kGy at this time.

Example 7: Preparation of Ionic Polymer Membrane 3

The ionic polymer membrane was prepared by the same manner as described in Example 5 except that the dose of electron beam was 200 kGy at this time.

Example 8: Preparation of Ionic Polymer Membrane 4

The ionic polymer membrane was prepared by the same manner as described in Example 5 except that the SPVA having the substitution ratio of 18 mol % prepared from poly(vinyl alcohol) with the molecular weight of 89,000 prepared in Example 2 was mixed with 20 g of poly(sodium 4-styrene sulfonate) (PSSNa, MW: 1,000,000, Aldrich), the ionic polymer, in poly(sodium 4-styrene sulfonic acid) (PSS) treated with 2 M $H_2SO_4$ aqueous solution and the solvent dimethylacetamide (DMAc) at the weight ratio of 6.5:3.5.

Example 9: Preparation of Ionic Polymer Membrane 5

The ionic polymer membrane was prepared by the same manner as described in Example 8 except that the dose of electron beam was 100 kGy at this time.

Example 10: Preparation of Ionic Polymer Membrane 6

The ionic polymer membrane was prepared by the same manner as described in Example 8 except that the dose of electron beam was 200 kGy at this time.

Example 11: Preparation of Ionic Polymer Membrane 7

The ionic polymer membrane was prepared by the same manner as described in Example 5 except that the SPVA/ ionic polymer mixed solution was prepared with the anionic poly(diallydimethyl ammonium chloride) (PDDA, MW: 400,000~500,000, Aldrich) solution dissolved in distilled water (20 weight %) was diluted in dimethyl sulfoxide solvent, resulting in the mixed solution containing SPVA and PDDA at the weight ratio of 6.5:3.5.

Example 12: Preparation of Ionic Polymer Membrane 8

The ionic polymer membrane was prepared by the same manner as described in Example 11 except that the dose of electron beam was 100 kGy at this time.

Example 13: Preparation of Ionic Polymer Membrane 9

The ionic polymer membrane was prepared by the same manner as described in Example 11 except that the dose of electron beam was 200 kGy at this time.

Example 14: Preparation of Carbon Composite Electrode 1

Step 1: As a binder for the preparation of carbon electrode, the SPVA having the substitution ratio of 18 mol % prepared from poly(vinyl alcohol) with the molecular weight of 130,000 prepared in Example 4 was dissolved in dimethylacetamide (DMAc) solvent at room temperature, resulting in the 3 weight % solution. 18.9 g of activated carbon (AC, specific surface area=1600 $m^2$/g, Cat. No: P-60, Kuraray Chemical. Co., Ltd.) was added to make the mixing ratio of SPVA and electroactive material to be 1:9, followed by dispersion using a mixer (ARE 310, Thinky, Japan). As a result, the SPVA/electroactive material mixed solution was prepared.

Then, casting with the SPVA/electroactive material mixed solution prepared above was performed with a bar coater (CT-AF300VH, Coretech, Korea) on the current collector (thickness: 130 μm, Dongbangcarbon Co., Ltd., Cat. No. F02511C) at 50° C. with the speed of 50 mm/sec., followed by drying in a 70° C. oven for 4 hours to form a carbon electrode.

Step 2: The SPVA having the substitution ratio of 10 mol % prepared from poly(vinyl alcohol) with the molecular weight of 89,000 prepared in Example 1 and the ionic polymer, cationic poly(sodium 4-styrene sulfonate) (PSSNa, MW: 1,000,000, Aldrich) were dissolved respectively in dimethyl sulfoxide and distilled water, resulting in the 11 weight % solution. Then, a mixed solution comprising SPVA and PSSNa at the weight ratio of 6:4 was prepared.

Bar coating was performed with the prepared SPVA/ionic polymer mixed solution to form an ionic polymer thin film under the same condition of step 1. Then, a carbon composite electrode was formed by drying the film in a 80° C. oven for 4 hours. Step 3: The carbon composite electrode having a 3-dimensional network structure was formed by irradiating the carbon electrode formed in step 1 with electron beam at the dose of 50 kGy by using 2.5 MeV electron beam accelerator (EBTech, Daejeon).

Comparative Example 1

Poly(vinyl alcohol) (weight-average molecular weight: 89000, degree of hydrolysis: 99%, Aldrich) was dissolved in dimethylsulfoxide at 70° C., resulting in 5 weight % poly(vinyl alcohol) solution.

The prepared solution was cooled down at room temperature. 300 ml of the solution was added in a 500 ml round flask, to which glycidyl methacrylate (GMA, Aldrich) was added at the ratio of 10 mol % by the content of the poly(vinyl alcohol) OH functional group. Tetramethylethylenediamine (TEMED, Aldrich) was also added thereto at the ratio of 1 mol % by the content of the poly(vinyl alcohol) OH functional group. Catalyst-free substitution reaction was induced at 60° C. for 8 hours.

The mixture was precipitated in acetone, the non-soluble solvent, followed by drying. As a result, hydrophilic poly(vinyl alcohol) (substituted poly(vinyl alcohol), SPVA) having the theoretical substitution ratio of 10 mol % was prepared.

Comparative Example 2

The ionic polymer membrane was prepared by the same manner as described in example 5 except that radiation crosslinking was not performed herein.

Comparative Example 3

The ionic polymer membrane was prepared by the same manner as described in example 8 except that radiation crosslinking was not performed herein.

Comparative Example 4

The ionic polymer membrane was prepared by the same manner as described in example 11 except that radiation crosslinking was not performed herein.

Comparative Example 5

The ionic polymer membrane was prepared by the same manner as described in Example 5 except that heat crosslinking was performed in a 150° C. oven for 24 hours instead of radiation crosslinking.

Comparative Example 6

The ionic polymer membrane was prepared by the same manner as described in Example 8 except that heat crosslinking was performed in a 150° C. oven for 24 hours instead of radiation crosslinking.

Comparative Example 7

The ionic polymer membrane was prepared by the same manner as described in Example 11 except that heat crosslinking was performed in a 150° C. oven for 24 hours instead of radiation crosslinking.

Comparative Example 8

The ionic polymer membrane was prepared by the same manner as described in Example 10 except that poly(vinyl alcohol-co-ethylene) (EVOH, Melt index: 3.9 g/10 min, Aldrich) was used instead of SPVA.

Comparative Example 9

The ionic polymer membrane was prepared by the same manner as described in Example 13 except that poly(vinyl alcohol-co-ethylene) (EVOH, Melt index: 3.9 g/10 min, Aldrich) was used instead of SPVA.

The experimental conditions for the examples and comparative examples above are shown in Table 1 below.

TABLE 1

| | Material | | | | Electron beam dose (kGy) |
|---|---|---|---|---|---|
| | Binder | Ionic polymer | Electroactive material | Composition (Weight ratio) | |
| Example 5 | Example 1 | PSSNa | — | 6(SPVA):4(PSSNa) | 50 |
| Example 6 | Example 1 | PSSNa | — | 6(SPVA):4(PSSNa) | 100 |
| Example 7 | Example 1 | PSSNa | — | 6(SPVA):4(PSSNa) | 200 |
| Example 8 | Example 2 | PSS | — | 6.5(SPVA):3.5(PSS) | 50 |
| Example 9 | Example 2 | PSS | — | 6.5(SPVA):3.5(PSS) | 100 |
| Example 10 | Example 2 | PSS | — | 6.5(SPVA):3.5(PSS) | 200 |
| Example 11 | Example 1 | PDDA | — | 6.5(SPVA):3.5(PDDA) | 50 |
| Example 12 | Example 1 | PDDA | — | 6.5(SPVA):3.5(PDDA) | 100 |
| Example 13 | Example 1 | PDDA | — | 6.5(SPVA):3.5(PDDA) | 200 |
| Example 14 | Example 1 | PSSNa | — | 6(SPVA):4(PSSNa) | 50 |
| | Example 4 | — | Activated carbon | 1(SPVA):9(activated carbon) | |
| Comparative Example 2 | Example 1 | PSSNa | — | 6(SPVA):4(PSSNa) | — |
| Comparative Example 3 | Example 2 | PSS | — | 6.5(SPVA):3.5(PSS) | — |
| Comparative Example 4 | Example 1 | PDDA | — | 6.5(SPVA):3.5(PDDA) | — |
| Comparative Example 5 | Example 1 | PSSNa | — | 6(SPVA):4(PSSNa) | heat crosslinking |
| Comparative Example 6 | Example 2 | PSS | — | 6.5(SPVA):3.5(PSS) | heat crosslinking |
| Comparative Example 7 | Example 1 | PDDA | — | 6.5(SPVA):3.5(PDDA) | heat crosslinking |
| Comparative Example 8 | EVOH | PSS | — | 6.5(EVOH):3.5(PSS) | 200 |
| Comparative Example 9 | EVOH | PDDA | — | 6.5(EVOH):3.5(PDDA) | 200 |

Experimental Example 1: Chemical Structure and Substitution Ratio of Hydrophilic Poly(Vinyl Alcohol) (SPVA)

To analyze the chemical structure of the SPVAs prepared in Example 1~4 and Comparative Example 1, $^1$H NMR was performed with proton nuclear magnetic resonance spectroscope (NMR-400, 400 MHz, JEOL) using deuterated dimethyl sulfoxide (DMSO-$d_6$, Aldrich) as a solvent. The substitution ratio (DS) and yield were calculated by the mathematical formulas below. The results are shown in FIGS. 1-5.

substitution ratio($DS$)={(($A$(H)+$A$(H')/2)/(($A$(H)+$A$(H')/2)+$A$(OH))}×100    <Mathematical Formula 1>

(In the mathematical formula 1, A(H) and A(H') present the areas of hydrogen peaks indicating the double bonds of the methacryloyl groups on the locations of δ 5.6 ppm and δ 6.0 ppm on NMR spectrum. A(OH) presents the area of hydrogen peak of OH located in between δ 4.2 ppm~4.6 ppm.)

Yield=$DS_2/DS_1$×100    <Mathematical Formula 2>

(In the mathematical Formula 2, $DS_1$ and $DS_2$ indicate the substitution ratio predicted by each response ratio and the substitution ratio obtained by NMR.)

Figure 1:
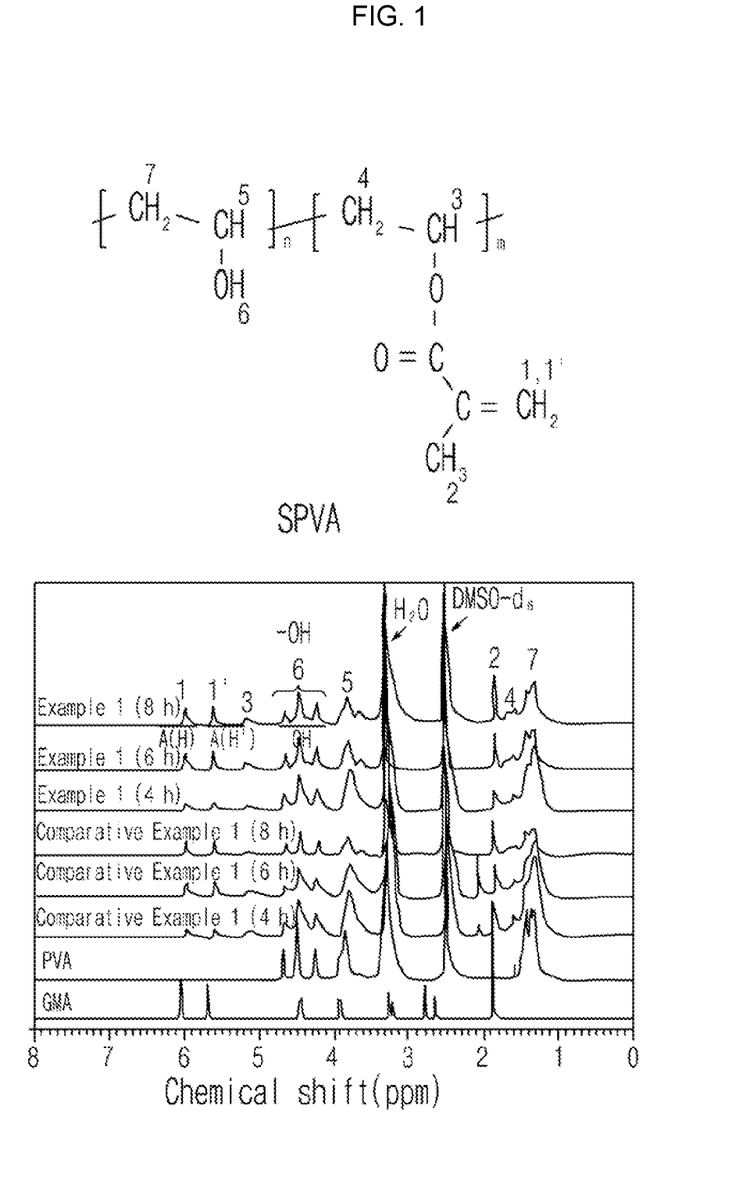
FIG. 1 presents the $H^1$ NMR results for the SPVAs prepared in Example 1 and Comparative Example 1 for the same reaction time of 4 hr, 6 hr, and 8 hr.

As shown in FIG. 1, the peaks indicating that the glycidylmethacrylate (GMA) methacryol group has been introduced in poly(vinyl alcohol) (PVA) OH on $^1$H NMR of the SPVAs prepared in Example 1 and Comparative Example 1 were located at δ 1.8 ppm, δ 5.6 ppm, and δ 6.0 ppm.

Figure 2:
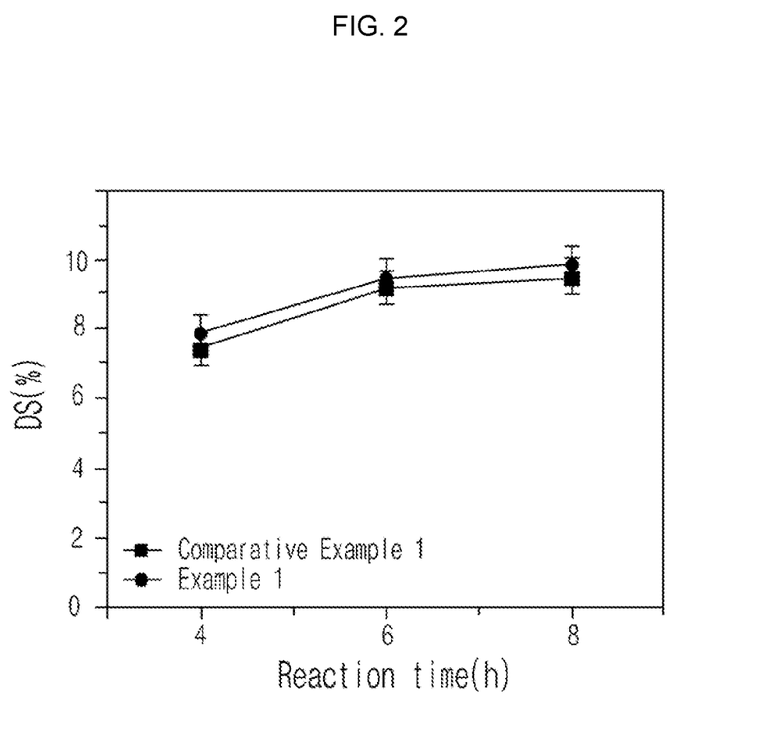
FIG. 2 and FIG. 3 present the substitution ratios and yields of the SPVAs prepared in Example 1 and Comparative Example 1 for the same reaction time of 4 hr, 6 hr, and 8 hr.
Figure 3:
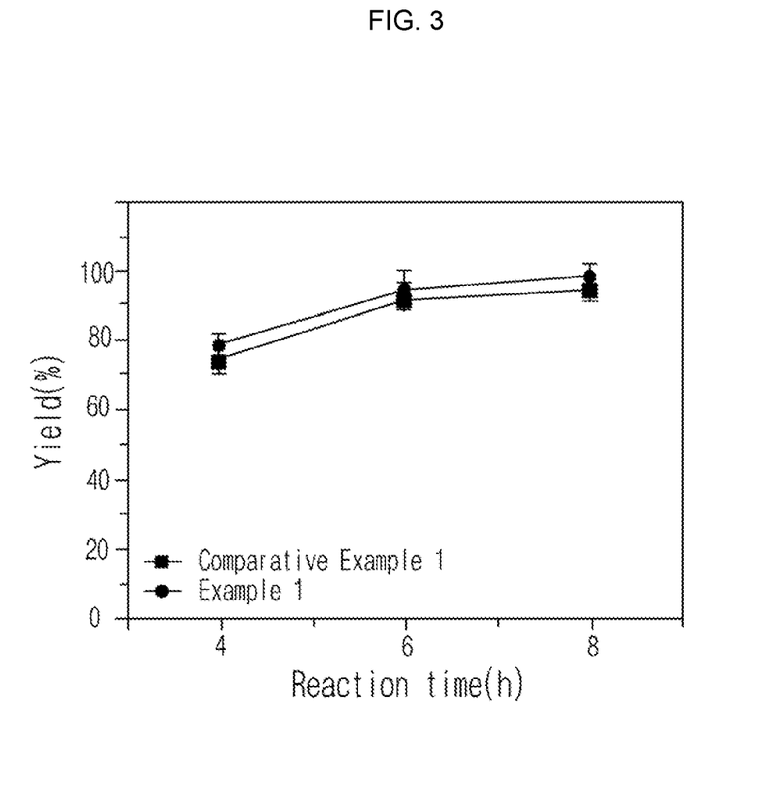

As shown in FIG. 2 and FIG. 3, the substitution ratio and yield of the SPVAs prepared in Comparative Example 1 and Example 1 were high overall in the error range and increased according to the reaction time. The substitution ratio and yield reached saturation 6 hours later. Therefore, it was confirmed that SPVA was successfully prepared with at least 95% yield via the catalyst-free substitution reaction for at least 4 hour in Example 1, unlike Comparative Example 1.

Figure 4:
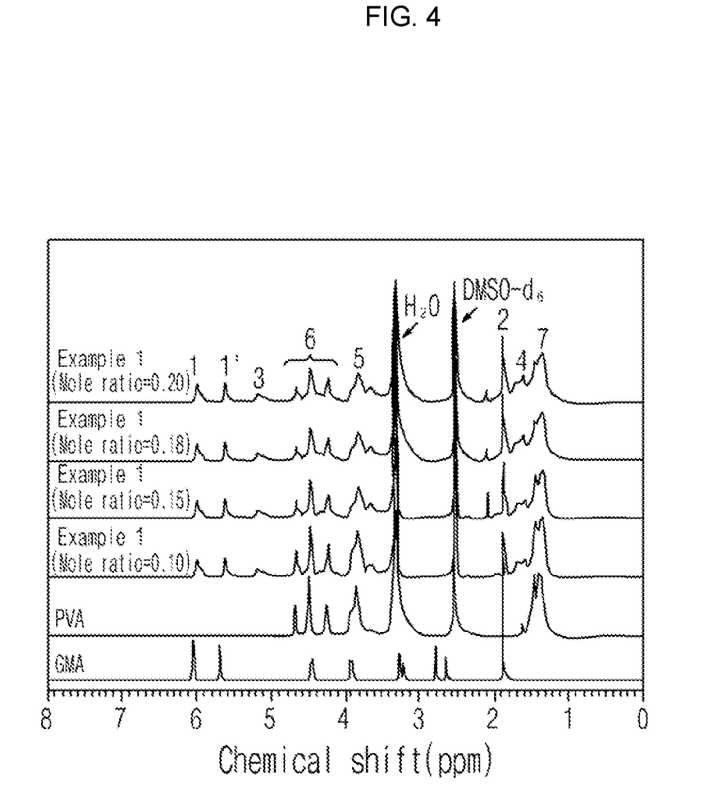
FIG. 4 and FIG. 5 present the results of $H^1$ NMR, the substitution ratios and yields of the SPVAs prepared in Examples 1 to 4.
Figure 5:
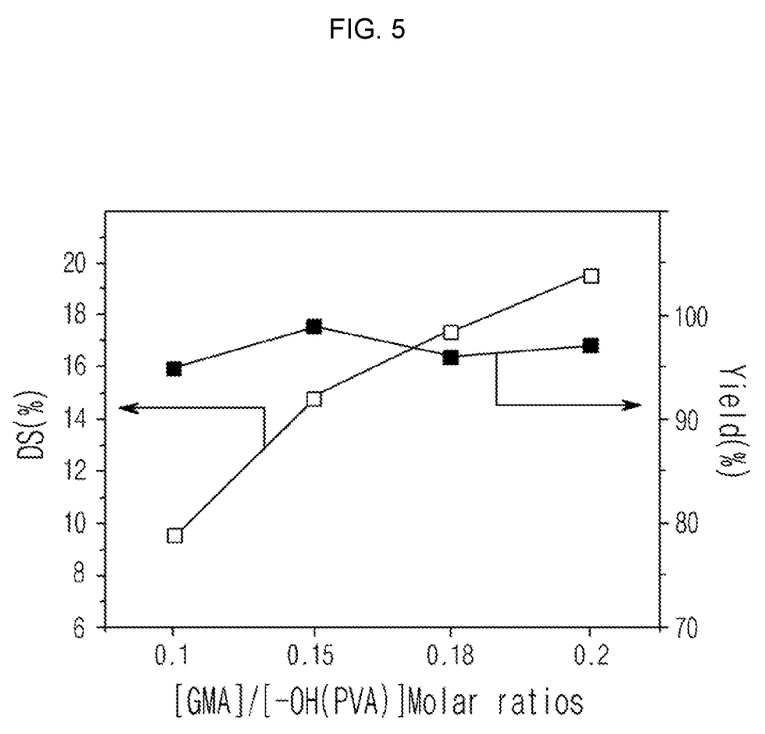

Further, as shown in FIG. 4 and FIG. 5, it was confirmed that the SPVAs prepared in Examples 1~4 displayed different substitution ratios.

Experimental Example 2: Radiation Crosslinking of Hydrophilic Poly(Vinyl Alcohol) (SPVA)

To investigate whether or not the 3-dimensional network structure could be formed on SPVA by irradiation, the SPVA prepared in Example 3 was dissolved in DMSO to prepare the 5 weight % SPVA solution. The solution was casted on the glass board, followed by drying at 70° C. for 8 hours, resulting in a 150 μm thick film.

For the comparison, the film was also prepared by the same manner as described above with poly(vinyl alcohol) (PVA) having the molecular weight of 130,000. The prepared SPVA and PVA films were irradiated with electron beam at the doses of 50 kGy, 100 kGy, and 200 kGy by using 2.5 MeV electron beam accelerator (EBTech, Daejeon).

To confirm the formation of the 3-dimensional network structure, the crosslinking degree was measured by solvent extraction. Particularly, 1 g of the SPVA or PVA film prepared above was loaded in a 200 mesh iron net, which was added to DMSO. Extraction was performed at 80° C. for 24 hours, followed by drying in a 50° C. vacuum oven. The crosslinking degree was calculated by mathematical formula 3 and the results are shown in FIG. 6.

Crosslinking degree (%)=$W_1/W_2$×100    <Mathematical Formula 3>

(In the mathematical formula 3, $W_1$ indicates the weight after the solvent extraction and $W_2$ indicates the weight before the solvent extraction.)

Figure 6:
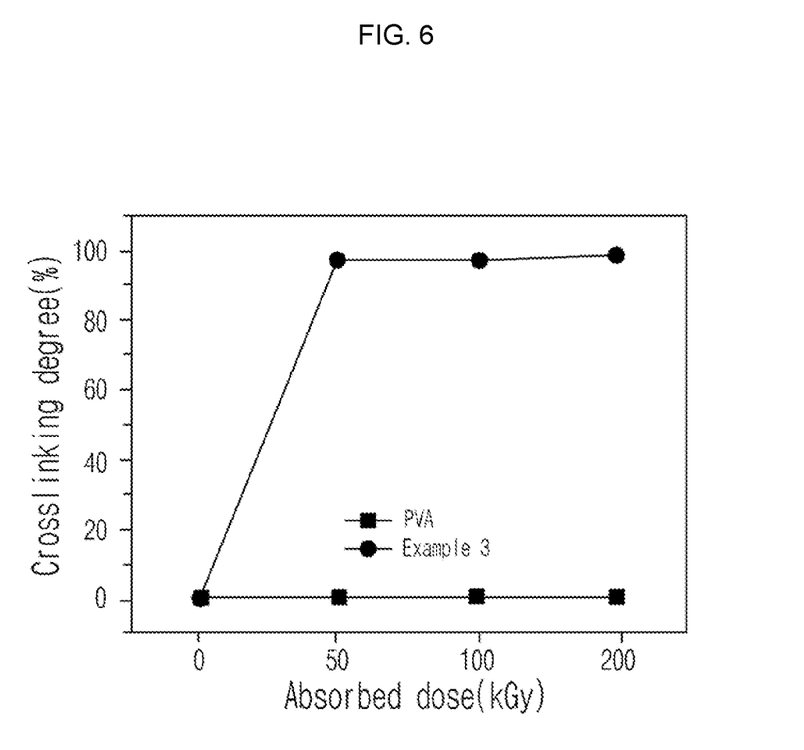
FIG. 6 is a graph illustrating the crosslinking degree of the SPVA prepared in Example 3 and the pure poly(vinyl alcohol) (PVA) as a function of absorbed doses.

As shown in FIG. 6, the cross-linking reaction did not occur in the pure PVA at the given radiation dose. On the other hand, 100% gelation was observed in the SPVA having the radiation cross-linkable double bond even at the absorbed dose of 50 kGy corresponding to the much shorter irradiation time of 1 min. Therefore, it was confirmed that the SPVA of the present invention could be readily dimensionally networked in a short period of time at room temperature simply by irradiation due to the double bond.

Experimental Example 3: Investigation of Crosslinking Degree, Moisture Content, Ion Exchange Capacity, and Membrane Resistance of Ionic Polymer Membrane The crosslinking degree, moisture content, ion exchange capacity, and membrane resistance of the ionic polymer membrane of the present invention, precisely of the ionic polymer membranes irradiated with electron beam at the dose of 200 kGy in Example 7, Example 10, and Example 13, or not irradiated in Comparative Example 2, Comparative Example 3, and Comparative Example 4, were measured as follows and the results are shown in Table 2.

(1) Measurement of Crosslinking Degree 1 g of the ionic polymer membrane was loaded in a 200 mesh iron net, which was added in extraction solvent. Extraction was performed at 80° C. for 3 days, followed by drying in a 50° C. vacuum oven. The crosslinking degree was calculated by mathematical formula 4. For the cationic exchange membranes prepared in Examples 7 and 10, and Comparative Examples 2, 3, 5, 6, and 8, DMAc was used as the extraction solvent. For the anionic exchange membranes prepared in Example 13 and Comparative Examples 4, 7, and 9, DMSO was used as the extraction solvent.

Crosslinking degree (%)=$W_1/W_2 \times 100$  <Mathematical Formula 4>

(In the mathematical formula 4, $W_1$ indicates the weight after the solvent extraction and $W_2$ indicates the weight before the solvent extraction.)

(2) Measurement of Ion Exchange Capacity

To measure the ion exchange capacity of the cationic exchange membranes prepared in Examples 7 and 10, and Comparative Examples 2, 3, 5, 6, and 8, the membranes were dipped in 3 M NaCl aqueous solution for 24 hours. The generated hydrogen chloride was titrated with NaOH and the ion exchange capacity was calculated by mathematical formula 5.

Ion exchange capacity (meq/g)=$N \times Y/W$  <Mathematical Formula 5>

(In the mathematical formula 5, N indicates the molality (meq/ml) of NaOH, Y presents the volume (ml) of NaOH titrated, and W presents the dried weight (g) of the sample.)

To measure the ion exchange capacity of the anionic exchange membranes prepared in Example 13 and Comparative Examples 4, 7, and 9, the membranes were dipped in NaCl solution to change the quaternary ammonium group into the form of —$N^+(CH_3)_3Cl^-$. Then, the membranes were dipped again in 1.0 M $Na_2CO_3$ solution to substitute that with $N^+(CH_3)_3CO_3^-$. One or two drops of 5% potassium chromate solution were added to the solution. $AgNO_3$ was loaded thereto until the red-brown precipitate was observed and the amount of $AgNO_3$ consumed until then was calculated. Then, the ion exchange capacity was calculated by mathematical formula 6.

Ion exchange capacity(meq/g)=$V \times C/W$  <Mathematical Formula 6>

(In the mathematical formula 6, V presents the volume (ml) of $AgNO_3$ consumed above, C indicates the concentration of $AgNO_3$ solution used, and W presents the dried weight (g) of the sample.)

(3) Measurement of Moisture Content

The ionic polymer membrane was cut into a regular pieces (4×4 cm), and then the weight of the dried ionic polymer membrane was measured. The membrane fragments were dipped in 50° C. distilled water for 7 days for the full swelling. Then, moisture on the surface of the ionic polymer membrane was eliminated and weighed. The moisture content was calculated by mathematical formula 7.

Moisture content (%)=$W_1/W_2 \times 100$  <Mathematical Formula 7>

(In the mathematical formula 7, $W_1$ presents the weight (g) after the water immersion and $W_2$ presents the dried weight (g) before the water immersion.)

(4) Measurement of Membrane Resistance

To measure the electric resistance of the ionic polymer membrane, 4-probe cells were used. The ionic polymer membrane was cut into regular pieces (4×4 cm), which were squeezed in the electrochemical cell. The electric resistance ($R_1$) was measured in 0.5 M NaCl solution. The membrane was eliminated and the resistance of the electrolytic solution alone was measured ($R_2$). The membrane resistance was calculated by mathematical formula 8.

Membrane resistance ($\Omega \cdot cm^2$)=$(R_1-R_2) \times A$  <Mathematical Formula 8>

(In the mathematical formula 8, $R_1$ presents the total resistance value of the ionic polymer membrane and 0.5 M NaCl electrolytic solution, and $R_2$ indicates the resistance of 0.5 M NaCl electrolytic solution alone, and A indicates the area ($cm^2$) of the membrane measured above.)

TABLE 2

|  |  | Absorbed dose (kGy) | Crosslinking degree (wt %) | Moisture content (wt %) | Ion exchange capacity (meq/g) | Membrane resistance ($\Omega \cdot cm^2$) |
|---|---|---|---|---|---|---|
| Example 7 | Cationic exchange membrane | 200 | 100 | 16 | 2.00 | 1.97 |
| Example 10 | Cationic exchange membrane | 200 | 100 | 30 | 1.80 | 1.16 |
| Example 13 | Anionic exchange membrane | 200 | 100 | 30 | 2.33 | 1.29 |

TABLE 2-continued

| | | Absorbed dose (kGy) | Crosslinking degree (wt %) | Moisture content (wt %) | Ion exchange capacity (meq/g) | Membrane resistance (Ω·cm²) |
|---|---|---|---|---|---|---|
| Comparative Example 2 | Cationic exchange membrane | 0 | 0 | Not measured | — | — |
| Comparative Example 3 | Cationic exchange membrane | 0 | 0 | Not measured | — | — |
| Comparative Example 4 | Anionic exchange membrane | 0 | 0 | Not measured | — | — |
| Comparative Example 5 | Cationic exchange membrane | 0 | 50 | 150 | — | — |
| Comparative Example 6 | Cationic exchange membrane | 0 | 50 | 230 | — | — |
| Comparative Example 7 | Anionic exchange membrane | 0 | 30 | 200 | — | — |
| Comparative Example 8 | Cationic exchange membrane | 200 | 0 | 600 | — | — |
| Comparative Example 9 | Anionic exchange membrane | 200 | 0 | 600 | — | — |

As shown in Table 2, the cationic exchange membranes prepared in Examples 7 and 10 irradiated at the dose of 200 kGy (irradiation time: 4 min) exhibited the crosslinking degree of 100 wt % due to the formation of a complete 3-dimensional network structure, unlike the membranes prepared in Comparative Examples 2, 3, 5, 6, and 8. The moisture content, ion exchange capacity, and membrane resistance were respectively 30 wt % or under, 1.80 meq/g or up, and 1.97 Ω·cm² or under. The anionic exchange membrane prepared in Example 13 irradiated at the dose of 200 kGy (irradiation time: 4 min) exhibited the crosslinking degree of 100 wt % due to the formation of a complete 3-dimensional network structure, unlike the membranes prepared in Comparative Examples 4, 7, and 9. The moisture content, ion exchange capacity, and membrane resistance were respectively 30 wt % or under, 2.33 meq/g or up, and 1.29 Ω·cm² or under.

Therefore, it was confirmed that the cationic and anionic exchange membranes prepared by the method of the present invention had excellent properties and characteristics, compared with the conventional membranes such as Nafion 117 (cation exchange capacity: 0.900 meq/g, moisture content: 16 wt %, membrane resistance: 1.5 Ω·cm², DuPont Co., USA) and Neoseta AMX (anion exchange capacity: 1.4~1.7 meq/g, moisture content: 25~30 wt %, membrane resistance: 2.0~3.5 Ω·cm², Tokuyama Soda Co. Ltd. Japan), etc.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:

1. An ionic polymer membrane prepared by irradiating the compound represented by the formula 1 below and an ionic polymer:

<Formula 1> wherein in the formula 1,

$R_1$ is hydrogen or $C_{1-6}$ straight alkyl or $C_{3-6}$ branched alkyl;

the number of repeating unit a is 500 to 5500; and the number of repeating unit b is 10 to 1500.

2. The ionic polymer membrane according to claim 1, wherein the compound is obtained by the reaction formula 1 below:

<Reaction Formula 1>

-continued

1

<Formula 1> wherein in the reaction formula 1, $R_1$ is hydrogen, $C_{1-6}$ straight alkyl, or $C_{3-6}$ branched alkyl;

$R_2$ is $C_{1-10}$ straight alkyl or $C_{3-10}$ branched alkyl wherein one or more hydroxy groups are substituted or non-substituted or halogen is substituted or non-substituted; or $C_{6-10}$ heteroaryl comprising one or more heteroatoms selected from the groups consisting of oxygen heteroatom and nitrogen heteroatom and halogen is substituted or non-substituted; or —$(CH_2)_n$—$R_3$, $R_3$ is non-substituted or substituted $C_{6-10}$ aryl, non-substituted or substituted $C_{3-10}$ cycloalkyl containing one or more oxygen atoms, $C_1$-$C_{10}$ straight alkoxy, or $C_{3-10}$ branched alkoxy;

n is an integer of 0 to 5;

the number of repeating unit a is 500 to 5500;

the number of repeating unit b is 10 to 1500; and the number of repeating unit c is 500 to 6000.

3. The ionic polymer membrane according to claim 1, wherein the mixing ratio of the compound represented by formula 1 and the ionic polymer is 1:9 to 8:2.

4. The ionic polymer membrane according to claim 1, wherein the radiation is selected from the group consisting of electron beam, gamma-ray, and X-ray.

5. The ionic polymer membrane according to claim 1, wherein the total dose of the radiation is 5 kGy-500 kGy.

6. A method for preparing the ionic polymer membrane according to claim 1 containing the step of spreading a mixed solution composed of the compound represented by formula 1 and the ionic polymer and then irradiating the mixture spread above:

wherein in the formula 1, $R_1$ is hydrogen or $C_{1-6}$ straight alkyl or $C_{3-6}$ branched alkyl;

The number of repeating unit a is 500 to 5500; and

The number of repeating unit b is 10 to 1500.

7. The method for preparing the ionic polymer membrane according to claim 6, wherein the mixed solution includes one or more solvents selected from the group consisting of N-methyl-2-pyrrolidone, dimethylsulfoxide, and dimethylformamide.

8. The method for preparing the ionic polymer membrane according to claim 6, wherein the spreading is accomplished by one of the methods selected from the group consisting of bar coating, roll coating, blade coating, and spray coating.

9. The method for preparing the ionic polymer membrane according to claim 6, wherein the ionic polymer is one or more polymers selected from the group consisting of the polymer having a cation exchanging functionality, the polymer having an anion exchanging functionality, and chelate resin.

10. The method for preparing the ionic polymer membrane according to claim 6, wherein the ionic polymer is one or more polymers selected from the group consisting of poly(sodium 4-styrene sulfonate) (PSSNa), poly(diallyldimethyl ammonium chloride) (PDDA), poly(2-acrylamido-2-methyl-1-propanesulfonic acid), poly(vinyl sulfonic acid), poly(acrylic acid), poly(4-styrene sulfonic acid-co-maleic acid), poly(vinyl phophonic acid), poly(allyl amine chloride), poly(acrylamido-co-diallydimethylammonium chloride), and poly((2-dimehtylamino) ethyl methacrylate) methyl chloride.

* * * * *